(12) United States Patent
Tang et al.

(10) Patent No.: US 9,853,530 B2
(45) Date of Patent: Dec. 26, 2017

(54) LINEAR MOTOR UNIT

(71) Applicant: SANYO DENKI CO., LTD., Tokyo (JP)

(72) Inventors: Yuqi Tang, Tokyo (JP); Kazuhito Yamaura, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 519 days.

(21) Appl. No.: 14/495,159

(22) Filed: Sep. 24, 2014

(65) Prior Publication Data

US 2015/0084441 A1 Mar. 26, 2015

(30) Foreign Application Priority Data

Sep. 24, 2013 (JP) .................................. 2013-197493

(51) Int. Cl.
| | |
|---|---|
| *H02K 41/02* | (2006.01) |
| *H02K 9/02* | (2006.01) |
| *H02K 41/03* | (2006.01) |
| *H02K 16/00* | (2006.01) |

(52) U.S. Cl.
CPC ............... *H02K 41/02* (2013.01); *H02K 9/02* (2013.01); *H02K 41/031* (2013.01); *H02K 16/00* (2013.01); *H02K 2201/18* (2013.01)

(58) Field of Classification Search
CPC ...... H02K 41/02; H02K 41/03; H02K 41/031; H02K 2201/18
See application file for complete search history.

(56) References Cited

U.S. PATENT DOCUMENTS 5,315,190 A * 5/1994 Nasar .................... H02K 35/06
  310/12.15
6,426,573 B1 * 7/2002 Hwang ................... B23Q 1/58
  310/12.04

FOREIGN PATENT DOCUMENTS

| JP | H06303737 A | 10/1994 |
|---|---|---|
| JP | 3300465 B2 | 7/2002 |
| JP | 2010057357 A | 3/2010 |

* cited by examiner

*Primary Examiner* — Dang Le
(74) *Attorney, Agent, or Firm* — Drinker Biddle & Reath LLP (57) ABSTRACT

A linear motor unit includes at least one first linear motor in which an armature is disposed spaced from a shaft guide supporting section which is provided at a distal end of a frame, and a shaft guide is disposed on a proximal side of the shaft guide supporting section; and at least one second linear motor in which an armature is disposed in contact with the proximal side the shaft guide supporting section which is provided at the distal end of the frame, and the shaft guide is disposed on the distal side of the shaft guide supporting section, wherein the first linear motors and the second linear motors are alternatively arranged in a width direction of the frame with the respective shaft guides of the linear motors aligned with each other, the shaft guide is rotated by a rotary motor.

12 Claims, 8 Drawing Sheets

LINEAR MOTOR UNIT

CROSS-REFERENCE TO RELATED APPLICATIONS

This application claims priority to Japanese Application No. 2013-197493, filed Sep. 24, 2013.

BACKGROUND

1. Technical Field

The present invention relates to a shaft rotation type linear motor unit that can apply a rotary movement and a linear movement to an object to be driven.

2. Description of Related Art

A linear motor is small in size and operable at high speed compared with mechanical actuation such as a ball screw mechanism since it operates by electromagnetic induction. For example, a rod type linear motor is used for a chip mounter (an electronic component mounting device) of a semiconductor manufacturing device.

The rod type linear motor includes a rod that includes permanent magnets and coils that surround the rod, and applies a thrust in the axis direction to the rod by using electromagnetic induction of a magnetic field of the permanent magnets and an electric current flowing in the coils so that the rod performs a linear movement.

Recently, a number of technique has been proposed for achieving a torque generator of a rotary motor and a thrust generator of a linear motor by devising a connecting mechanism of a ball spline and a bearing so as to perform a rotary movement and a linear movement.

As a technique for a linear motor that can perform a rotary movement and a linear movement, Japanese Patent No. 3300465 discloses an actuator with two degree of freedom which includes a rotary motion shaft having a linear shaft portion and a spline groove on part of the outer periphery of the rotary motion shaft, and a spline guide bearing that engages with the spline groove of the rotary motion shaft.

Further, Japanese Unexamined Patent Application. Publication No. 2010-57357 discloses a linear actuator which includes a second shaft member arranged in parallel with a rod of a linear motor. According to Japanese Unexamined Patent Application Publication No. 2010-57357, the distal end of the rod and the distal end of the second shaft member are connected by a first connecting member so that the second shaft member performs a linear movement as the rod performs a linear movement. The second shaft member and a housing are connected by a second connecting member so that the second shaft member can perform a linear movement and is prevented from being rotated about the axis of the rod.

According to the technique of Japanese Patent No. 3300465 and Japanese Unexamined Patent Application Publication No. 2010-57357, the connecting mechanisms are complicated, and therefore, the linear motor may not accommodate size reduction, space saving and weigh reduction.

Recently, a small-sized linear motor is developed which includes a center shaft for a linear movement configured to be unrotatable and an additional rotation shaft arranged in parallel with the center shaft so that the rotation shaft is rotatable in accordance with the movement of the center axis. However, the small-sized linear motor which includes the center shaft and the rotation shaft also needs a connecting section of the center shaft and the rotation shaft. Accordingly, it is disadvantageous for size reduction, space saving and weigh reduction of the linear motor.

SUMMARY

The present invention has been made in light of the above circumstances. An object of the present invention is to provide a shaft rotation type linear motor unit which includes a movable element, that can perform a linear movement and a rotary movement with a simple configuration and may accommodate size reduction, space saving and weight reduction.

Further, another object of the present invention is to provide a shaft rotation type linear motor unit having good heat dissipation with reduced cost and improved performance.

In order to achieve the above objects, a linear motor unit according to the present invention includes linear motors alternatively arranged side by side, each of which are provided with an armature disposed at different positions on a frame.

A rotatable and reciprocatable shaft guide is supported by a shaft guide supporting section that is provided on the distal end of the frame while the shaft is supported by the shaft guide.

The shaft guides of the respective linear motors are rotated by a rotary motor.

According to an aspect of the present invention, a linear motor unit includes linear motors alternatively arranged side by side, each of which are provided with an armature disposed at different positions on a frame, and shaft guides of the respective linear motors are rotated by a rotary motor. Further, the shaft is supported by a rotatable and reciprocatable shaft guide. Accordingly, the linear motor unit according to the present invention includes a movable element that can perform a linear movement and a rotary movement with a simple configuration, and may accommodate size reduction, space saving and weight reduction with reduced cost and improved performance.

DETAILED DESCRIPTION

With reference to the drawings, a linear motor unit according to the first and second embodiments will be described.

The linear motor unit according to the first and second embodiments includes linear motors alternatively arranged side by side, each of which are provided with an armature disposed at different positions on a frame, and shaft guides of the respective linear motors are rotated by a rotary motor. Further, the shaft is supported by a rotatable and reciprocatable shaft guide.

Accordingly, in the first and second embodiments, a linear motor unit which includes a movable element that can perform a linear movement and a rotary movement with a simple configuration, and which may accommodate size reduction, space saving and weight reduction with reduced cost and improved performance can be provided.

First Embodiment

Configuration of Linear Motor Unit

Figure 1:
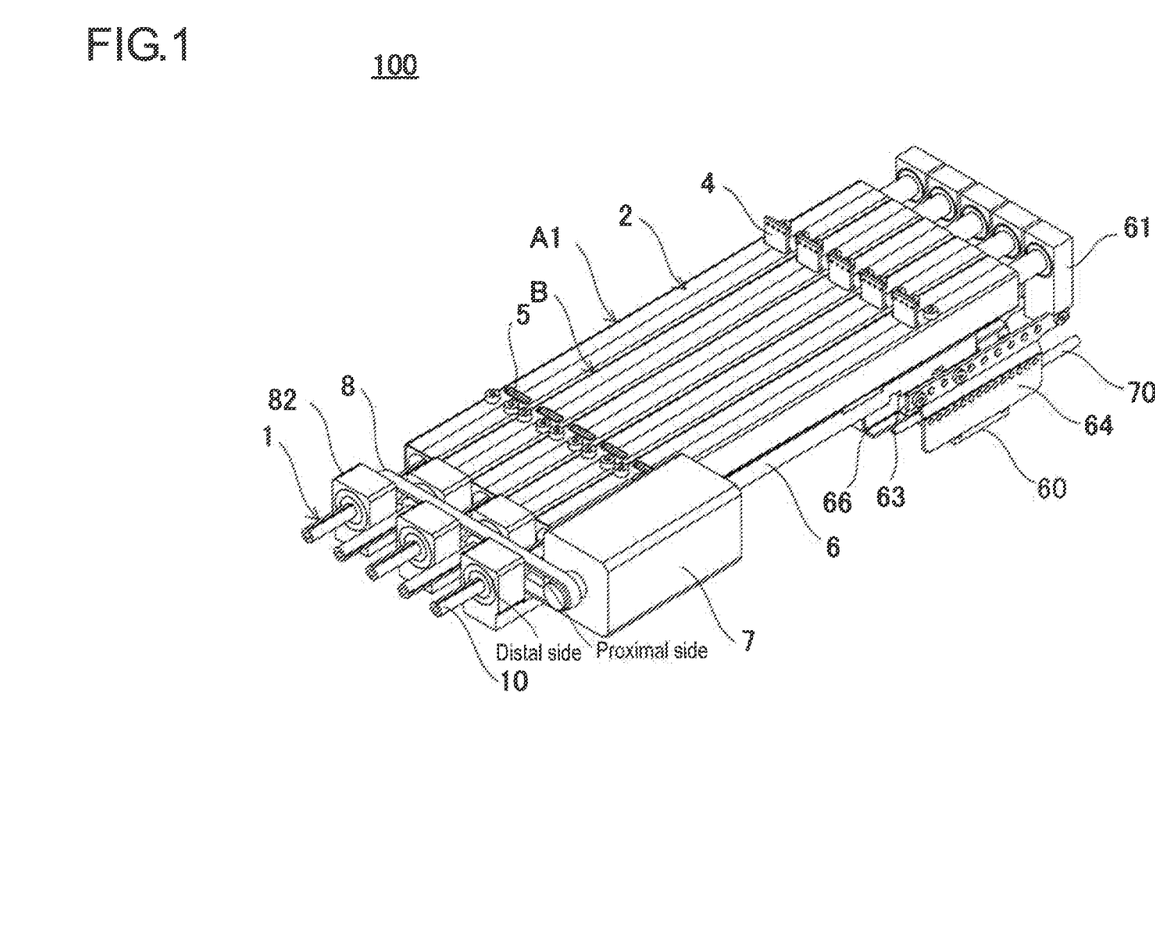
FIG. 1 is a perspective view of a linear motor unit according to the first embodiment.
Figure 2:
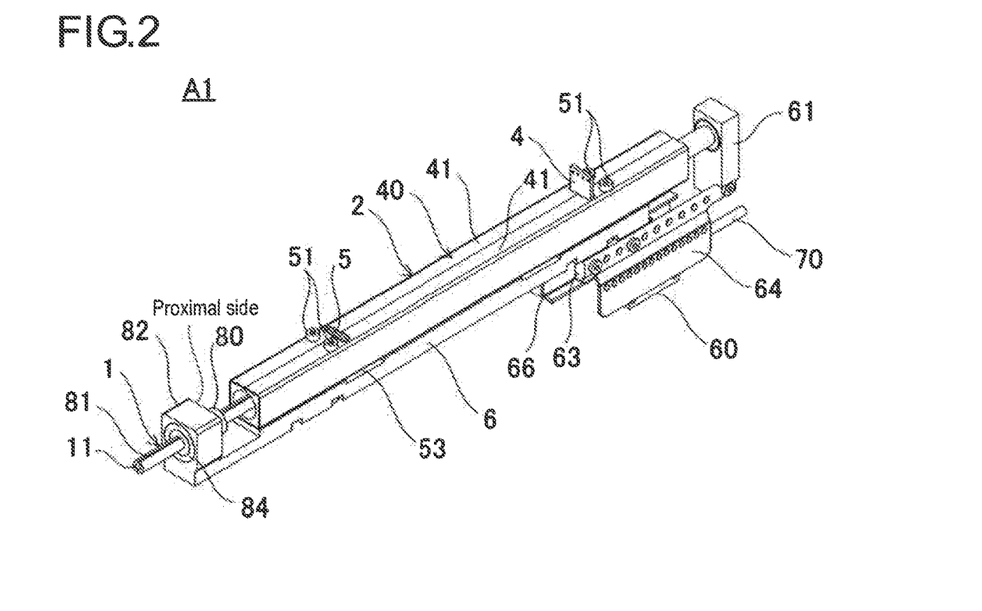
FIG. 2 is a perspective view of a linear motor A1 according to the first embodiment.
Figure 3:
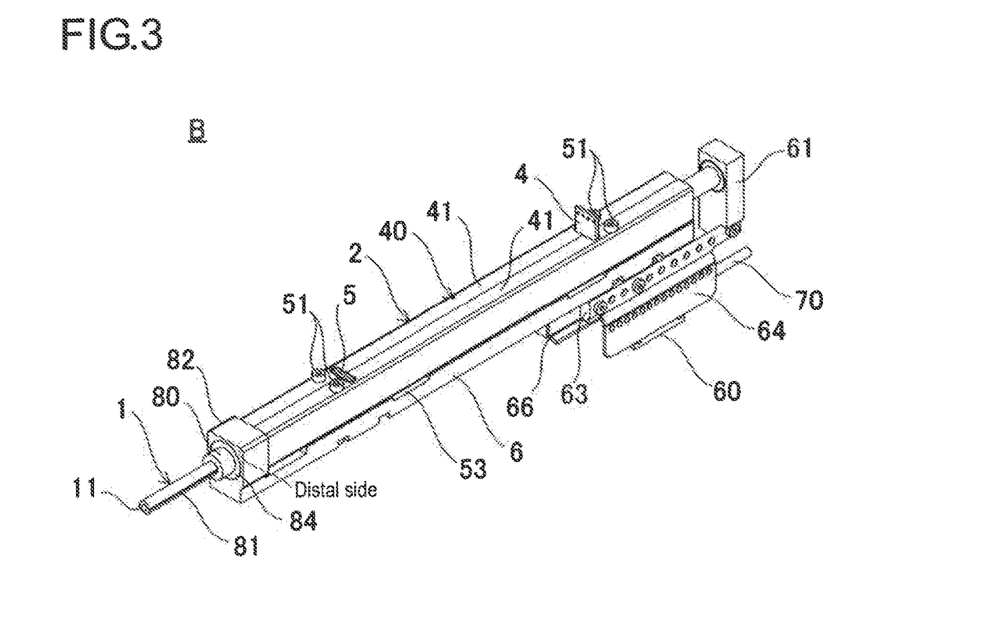
FIG. 3 is a perspective view of a linear motor B according to the first embodiment.
Figure 4:
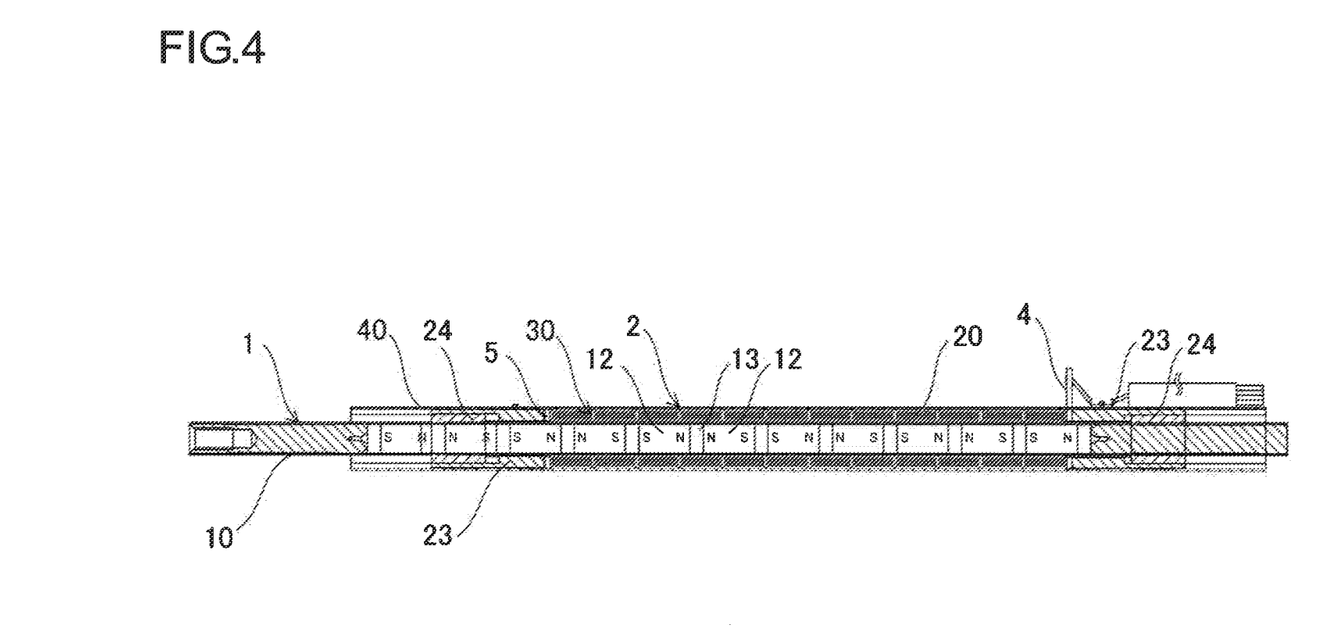
FIG. 4 is a vertical sectional view of an exciter and an armature of the linear motors A1, B according to the first embodiment.
Figure 5:
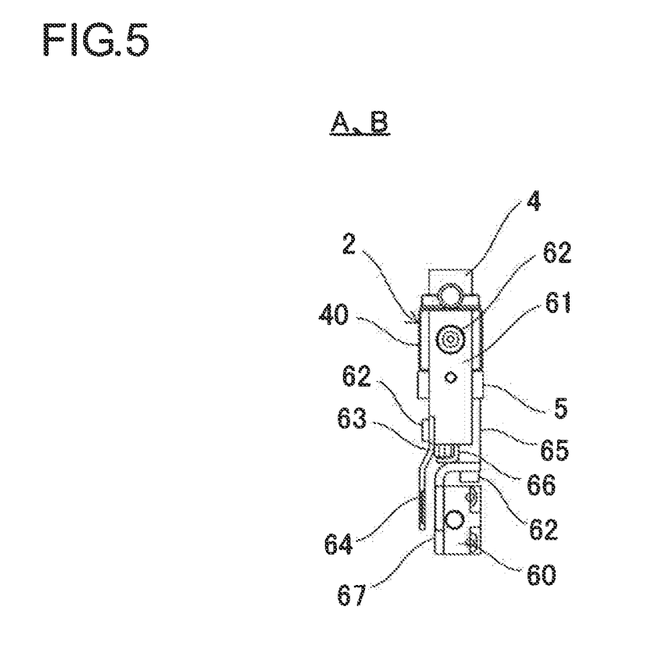
FIG. 5 is a right side view of the linear motors A1, B according to the first embodiment.

With reference to FIGS. 1 through 7, a linear motor unit according to the first embodiment will be described. FIG. 1 is a perspective view of a linear motor unit according to the first embodiment. FIG. 2 is a perspective view of a linear motor A1 according to the first embodiment. FIG. 3 is a perspective view of a linear motor B according to the first embodiment. FIG. 4 is a vertical sectional view of an exciter and an armature of the linear motors A1, B according to the first embodiment. FIG. 5 is a right side view of the linear motors A1, B according to the first embodiment.

As shown in FIG. 1, a linear motor unit 100 according to the first embodiment includes a plurality of linear motors A1, B and a rotary motor 7 for rotating the shafts 10 of the linear motors A1, B.

As shown in FIGS. 1 through 3, the respective linear motors A1, B includes an exciter 1, an armature 2, wiring boards 4, 5 and a frame 6. The linear motors A1 and B have generally the same configuration except for positions of the armatures 2 and positions of a shaft guides 80. The detail of positions of the armatures 2 and positions of the shaft guides 80 of the linear motors A1 and B will be described later.

The exciters 1 of the linear motors A1, B have the same configuration. As shown in FIG. 4, the exciter 1 includes the shaft 10 and permanent magnets 12. In this embodiment, the exciter 1 serves as a movable element. Further, in the following description, an advancing side of the shaft 10 is referred to as a distal side and a retracting side of the shaft 10 is referred to as a proximal side.

The shaft 10 is a cylindrical metal member having a hollow section 11. A material of the shaft 10 may include a non-magnetic material such as austenitic stainless steel, but is not limited thereto.

A plurality of permanent magnets 12 in a cylindrical shape are arranged in series in an axis direction in the hollow section 11 of the shaft 10. The permanent magnets 12 of this embodiment are magnetized so that the magnetic poles oppose each other (N—N, S—S) in the axis direction. A soft magnetic materials 13 in a cylindrical shape are interposed between the permanent magnets 12, 12 so that the magnetic poles 12 can be easily positioned with the magnetic poles opposing each other. However, the magnetic materials 13 may not be disposed.

The distal side of the shaft 10 is supported by a ball spline bushing which is provided as the shaft guide 80, which will be described later. Since the shaft 10 is supported by the ball spline bushing, the shaft 10 is rotatable and reciprocatable.

As shown in FIGS. 2 and 3, arc-shaped receiving grooves 81 are formed on the outer periphery of the shaft 10 in the axis direction of the shaft 10 (hereinafter, simply referred to as an "axis direction") so as to receive balls of the ball spline bushing. A pair of arc-shaped receiving grooves 81 are disposed in the radial direction of the shaft 10.

The armatures 2 of the linear motors A1 and B have the same configuration except for positions of the armatures 2 on the frame 6.

Referring again to FIG. 4, the armature 2 includes a plurality of coils 20 and a magnetic cover 40 in a rectangular tubular shape for surrounding the coils 20. In this embodiment, the armature 2 serves as a stator (linear guide).

The shaft 10 (movable element) which includes the permanent magnets 12 is surrounded by the plurality of coils 20 which are arranged in series in the axis direction. Each coil 20 is wound around an electrically insulating bobbin 30 in a cylindrical shape.

The plurality of coils 20 are arranged, for example in a case of a three phase AC power supply, in sequence of the U-phase, the V-phase and the W-phase in the axis direction. The plurality of coils 20 of the same phase group are continuously wound. In a case of a three phase AC power supply of this embodiment, each of the plurality of coils 20 of the U-phase group, the V-phase group and the W-phase group are continuously wound around a plurality of bobbins 30. That is, the coils 20 of each of the U-phase group, the V-phase group and the W-phase group are continuously wound around every three bobbins 30.

A cylindrically shaped bushing support section 23 is disposed on each end of the plurality of coils 20. The bushing support section 23 houses a guide bushing 24 of the shaft 10. Further, the guide bushing 24 may be directly housed in the magnetic cover 40, which is described later.

Figure 6:
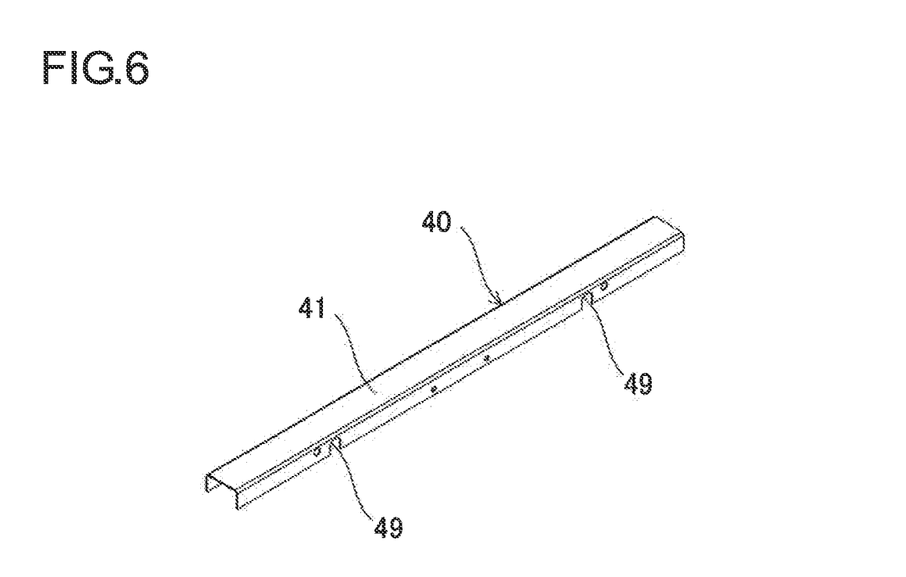
FIG. 6 is a perspective view of a cover piece of a magnetic cover according to the first embodiment.

FIG. 6 is a perspective view of a magnetic cover according to the first embodiment.

As shown in FIGS. 2, 3 and 6, the magnetic cover 40 is a magnetic metal member in a rectangular tubular shape. The magnetic cover 40 is formed of a pair of U-shaped cover pieces 41, 41 which are assembled into a rectangular tubular shape. The magnetic cover 40 surrounds the plurality of coils 20.

The magnetic cover 40 has a length longer than an entire length of the group of permanent magnets 12 of the shaft. 10 disposed in the coils 20 (see FIG. 4). The respective cover pieces 41, 41 include notches 49 which are formed in the intermediate part of the proximal end and the intermediate part of the distal end, respectively, so that the printed circuit boards 4, 5 are inserted therethrough in a standing state.

The magnetic cover 40 prevents flux leakage by closing a major portion of the magnetic flux of the permanent magnets 12 of the shaft 10. Since both ends of the magnetic cover 40 in the axis direction are open, air permeability is increased, thereby preventing heat generation of the coils 20.

A material of the magnetic cover 40 may be an iron magnetic material such as carbon steel for machine structural use. In order to ensure performance and cost reduction, the magnetic cover 40 is preferably made of a sheet metal or a press formed silicon steel sheet, however other materials may be used.

As shown in FIG. 4, the printed circuit boards 4, 5 are disposed between the bobbin 30 of the coil 20 and the bushing support sections 23 on both ends, respectively, in a vertically standing state with respect to the axis direction. Tap wires of the coils 20 of the U-phase group, the V-phase group and the W-phase group, connecting wires between the coils 20, 20 and end wires are separately positioned at different corners in the magnetic cover 40. The tap wires of the U-phase group, the V-phase group and the W-phase group are connected to the printed circuit board 5 on the distal side, while the end wires are connected to the printed circuit board 4 on the proximal side.

Figure 7:
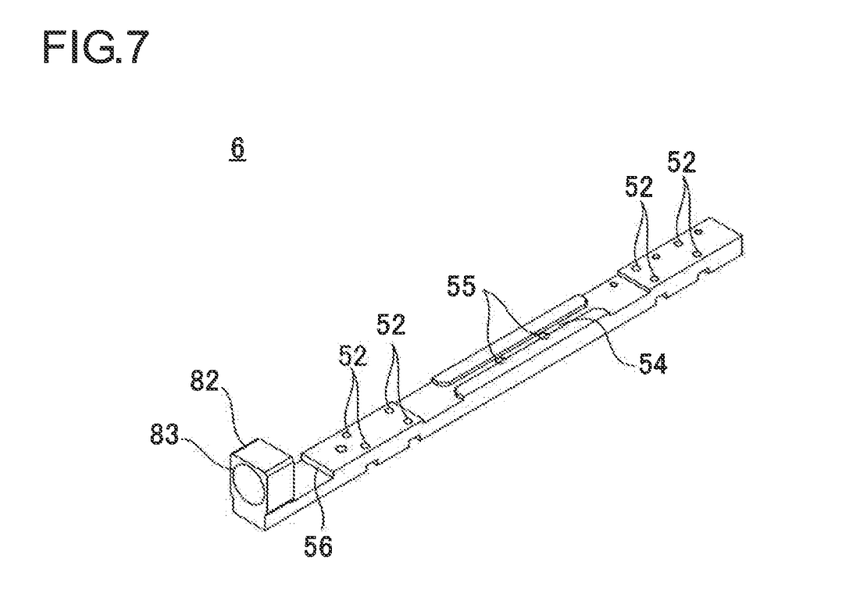
FIG. 7 is a perspective view of a frame according to the first embodiment.
Figure 8:
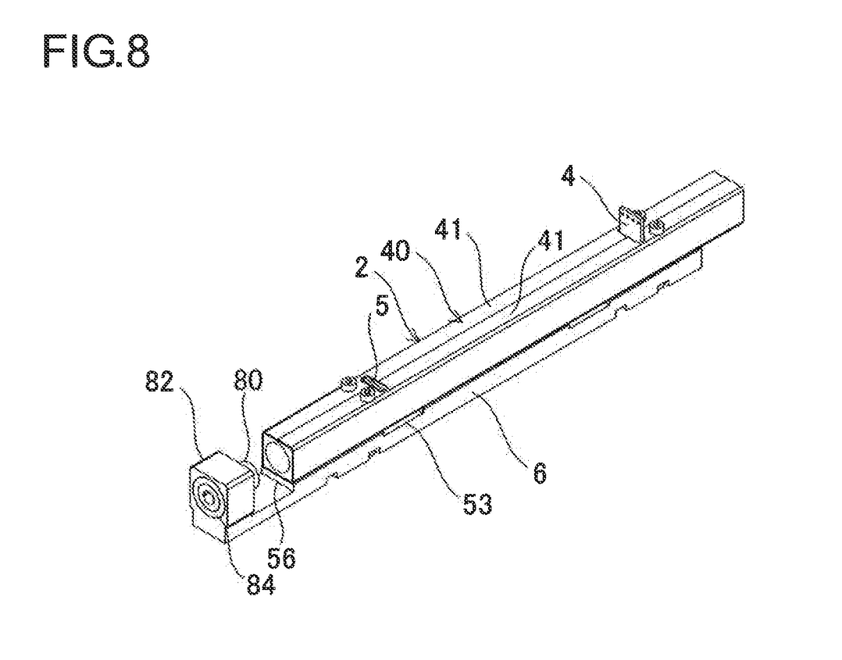
FIG. 8 is a perspective view of an armature position of the linear motor A1 according to the first embodiment.
Figure 9:
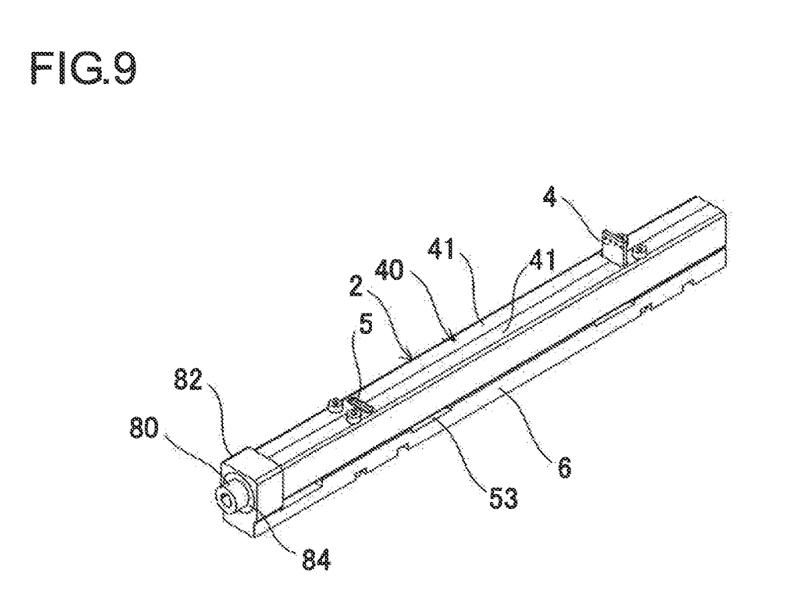
FIG. 9 is a perspective view of an armature position of the linear motor B according to the first embodiment.

FIG. 7 is a perspective view of a frame according to the first embodiment. FIG. 8 is a perspective view of an armature position of the linear motor A1 according to the first embodiment. FIG. 9 is a perspective view of an armature position of the linear motor 13 according to the first embodiment.

As shown in FIGS. 1, 2, 3 and 7, the frame 6 is an L-shaped plate member on which the exciter 1 and the armature 2 are mounted. A shaft guide supporting section 82 for supporting the ball spline bushing 80 as the shaft guide 80 is disposed on the distal end of the L-shaped frame 6. The shaft guide supporting section 82 is provided with a circular hole 83 at the center of the rectangular member. The circular hole 83 of the shaft guide supporting section 82 supports the ball spline bushing (shaft guide 80) via a bearing 84. Balls of the ball spline bushing roll along the arc-shaped receiving grooves 81.

A recess 54 is formed on the surface of the frame 6 so as to form a gap 53 between the frame 6 and the magnetic cover 40 and form a T-shaped cooling passage. A vent hole 55 is formed at the center portion of the recess 54. The vent hole 55 is internally threaded so that a cooling tube, which is not shown in the figure, can be connected thereto. A cooling air flows into the recess 54 that forms a cooling passage via the vent hole 55 and flows out of the gap 53. Since the cooling passage is formed between the frame 6 and the magnetic cover 40, heat dissipation from the coils 20 is facilitated.

The plate section of the L-shaped frame 6 is provided with through holes 52 through which bolts 51 are inserted. As shown in FIGS. 1 through 3, the bolts 51 are inserted into the through holes 52 of the L-shaped frame 6 and are fastened to an internal thread of the guide bushing 23 so as to fix the magnetic cover 40. That is, the armature 2 is disposed on the plate section of the L-shaped frame 6 and the exciter 1 is housed in the armature 2.

A step 56 is formed on the distal side of the plate section of the L-shaped frame 6 as a reference for positioning the armature 2 of the linear motor A1.

A material of the frame 6 may include, but is not limited to, an aluminum or aluminum alloy which is easily processed. The frame 6 may be easily formed, for example, by plastic working such as press working or cutting work.

As shown in FIGS. 2 and 8, the armature 2 of the linear motor A1 is positioned such that the distal end of the magnetic cover 40 is disposed spaced from the shaft guide supporting section 82. Specifically, the armature 2 of the linear motor A1 is positioned such that the distal end of the magnetic cover 40 corresponds to the step 56. The ball spline bushing (shaft guide 80) of the linear motor A1 is disposed to extend from the inside (the proximal end) of the shaft guide supporting section 82.

As shown in FIGS. 3 and 9, the armature 2 of the linear motor B is positioned such that the distal end of the magnetic cover 40 is in contact with the shaft guide supporting section 82. The ball spline bushing (shaft guide 80) of the linear motor B is disposed to extend from the outside (the distal end) of the shaft guide supporting section 82.

In the linear motor unit 100 according to this embodiment, a plurality of linear motors A1 and linear motors B are alternatively arranged side by side. Since the plurality of linear motors A1 and linear motors B are alternatively arranged side by side, the shaft guide supporting sections 82 of the linear motors A1 and the shaft guide supporting sections 82 of the linear motors B are arranged in an alternative pattern.

Since the ball spline bushings (shaft guides 80) of the linear motors A1 are positioned inside of the shaft guide supporting sections 82, and the ball spline bushings (shaft guides 80) of the linear motors B are positioned outside of the shaft guide supporting sections 82, a single timing belt 8 can be wound around the ball spline bushings (shaft guides 80) of a group of linear motors A1 and a group of linear motors B so that the ball spline bushings of a group of linear motors A1 and a group of linear motors B are driven by the same rotary motor 7.

As shown in FIGS. 1 through 3 and 5, the proximal end of the shaft 10 is fixed by a bolt 62 on a block member 61 which has a vertically disposed rectangular pillar shape. A moving member 63 which moves with the block member 61 along the guide rail 66 is fixed on the lower part of the frame 6 of the block member 61.

A gauge 64 to be measured by a linear sensor 60, which is described later, is fixed by the bolt 62 between one side of the lower part of the block member 61 and the distal end of the moving member 63.

Further, a downwardly extending member 65 in a plate shape is fixed on the lower part of the proximal end of the frame 6 at a position on the other side. A U-shaped guide rail 66 is fixed on the inner surface of the downwardly extending member 65. The moving member 63 is configured to slide along the guide rail 66.

Further, a support member 67 having an inverted L-shaped cross section is fixed on the underside of the downwardly extending member 65 by the bolt 62. The linear sensor 60 that detects the position of the gauge 64 and outputs the positional information is disposed on the support member 67. The linear sensor 60 is connected to an output line 70 to output the detected data.

The linear sensor 60 is disposed at a position away from the armature 2 that includes the coils 20 in consideration of magnetic and heat effect. The linear sensor 60 may be of a magnetic type, an optical type and other types.

[Operation of Linear Motor Unit]

Next, with reference to FIGS. 1 through 4, an operation of the linear motor unit 100 according to the first embodiment will be described.

As shown in FIG. 4, in the exciter 1 of the linear motor unit 100 according to the first embodiment, a plurality of permanent magnets 12 are disposed in the hollow section 11 of the shaft 10 and magnetized so that the magnetic poles oppose each other (N—N, S—S) in the axis direction. The armature 2 is disposed to surround the shaft 10 which houses the permanent magnets 12 and includes a plurality of coils 20 arranged in the axis direction. The coils 20 are disposed, for example, to correspond to the U-phase, the V-phase and the W-phase of a three phase AC power supply and supply an electric current to the coils 20 of the U-phase, the V-phase and the W-phase with phase shifted.

In the first embodiment, the exciter 1 of the linear motors A1, B serves as a movable element and the armature 2 serves as a stator. That is, in the respective linear motors A1, B, an electric current flows in the coils 20 of the armature 2 so as to intersect with the magnetic flux generated by the permanent magnets 12 of the exciter 1. When the electric current flowing in the armature 2 intersects with the magnetic flux of the permanent magnets 12, the respective linear motors A1, B generate a thrust in the axis direction to the shaft 10 which includes the permanent magnets 12 by electromagnetic induction effect, thereby causing a linear movement of the shaft 1.

In the linear motor unit 100 according to the first embodiment, a plurality of linear motors A1 and linear motors B are alternatively arranged side by side.

As shown in FIGS. 2 and 8, the armature 2 of the linear motor A1 is positioned such that the distal end of the magnetic cover 40 is disposed spaced from the shaft guide supporting section 82. The ball spline bushing (shaft guide 80) of the linear motor A1 is disposed on the inside of the shaft guide supporting section 82.

As shown in FIGS. 3 and 9, the armature 2 of the linear motor B is positioned such that the distal end of the magnetic cover 40 is in contact with the shaft guide supporting section 82. The ball spline bushing (shaft guide 80) of the linear motor B is disposed on the outside of the shaft guide supporting section 82.

That is, when the plurality of linear motors A1 and linear motors B are alternatively arranged side by side, the shaft guide supporting sections 82 of the linear motors A1 and the shaft guide supporting sections 82 of the linear motors B are arranged in an alternative pattern.

When the linear motors A1 having the ball spline bushings positioned inside of the shaft guide supporting sections 82 and the linear motors B having the ball spline bushings positioned outside of the shaft guide supporting sections 82 are assembled together, a single timing belt 8 can be wound around the ball spline bushings of a group of linear motors A1 and a group of linear motors B so that the ball spline bushings of a group of linear motors A1 and a group of linear motors B are driven by the same rotary motor 7.

Further, the shaft is supported by a rotatable and reciprocatable shaft guide. Further, tap wires of the coils 20 of the U-phase group, the V-phase group and the W-phase group, connecting wires between the coils 20, 20 and end wires are separately positioned at different corners in the magnetic cover 40. Accordingly, the linear motor unit 100 according to the first embodiment includes a movable element that can perform a linear movement and a rotary movement with a simple configuration, and may accommodate size reduction, space saving and weight reduction.

Further, each of the linear motors A1, B of this embodiment include the linear sensor 60. Accordingly, the linear motors A1, B can be used as a single-axis actuator. Alternatively, the plurality of linear motors A1, B can be combined to form the linear motor unit 100 of this embodiment and can be used as a multi-axis actuator.

Since the linear motors A1, B can be used as a single-axis or multi-axis actuator, a head configuration of a chip mounter can ensure flexibility.

Further, a recess 54 is formed on the upper surface of the frame 6 so as to form a gap 53 between the frame 6 and the magnetic cover 40 and form a cooling passage. A vent hole 55 is formed in the recess 54 of the frame 6. Accordingly, the armature 2 which includes the coils 20 can be cooled by allowing a cooling air to flow into the cooling passage formed by the gap 53 via the vent hole 55.

According to the first embodiment, the shaft rotation type linear motor unit 100 having good heat dissipation with reduced cost and improved performance can be provided.

The armature 2 surrounds the exciter 1 formed of the shaft 10 which includes the permanent magnets 12. The armature 2 houses the plurality of coils 20 in the magnetic cover 40.

Since the magnetic cover 40 is formed in a rectangular tubular shape made of a magnetic material, the magnetic cover 40 can be easily formed, for example, by sheet metal or press working of a silicon steel sheet. Further, the frame 6 can be easily formed, for example, by press working or cutting work. Accordingly, the linear motor unit 100 of the this embodiment can be manufactured with reduced cost and improved performance.

Since the magnetic cover 40 prevents flux leakage by closing a major portion of the magnetic flux of the permanent magnets 12, the linear motor unit 100 may eliminate a magnetic shield plate and accommodate size reduction, space saving and weight reduction.

The shaft 10 which includes the permanent magnets 12 is surrounded by the ring-shaped coils 20. The coils 20 are housed in the magnetic cover 40. Therefore, in the linear motor unit 100 of the first embodiment, the magnetic cover 40 can prevent flux leakage by closing a major portion of the magnetic flux of the permanent magnets 12.

Second Embodiment

Figure 10:
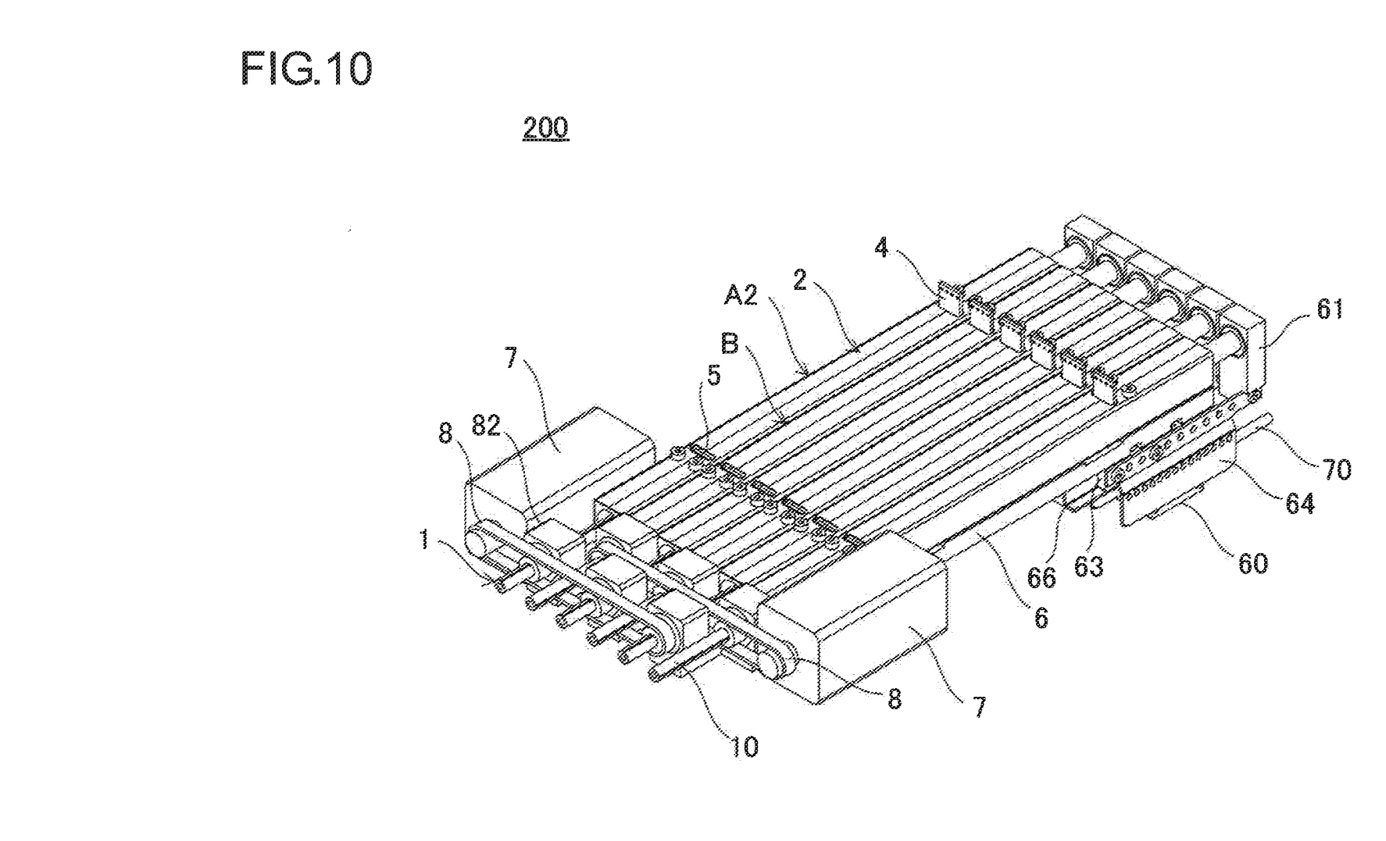
FIG. 10 is a perspective view of a linear motor unit according to the second embodiment.
Figure 11:
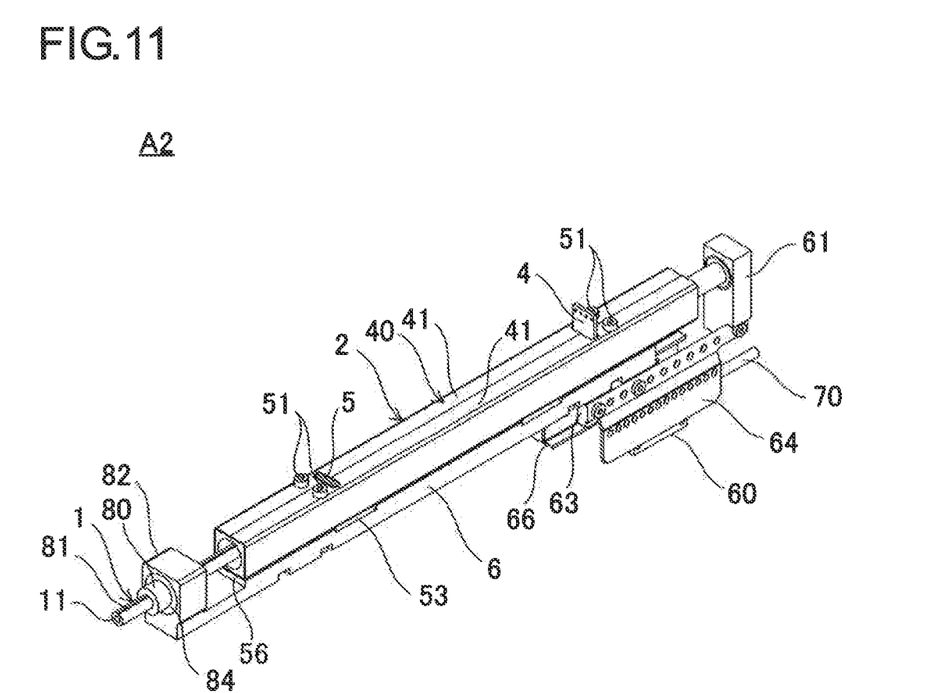
FIG. 11 is a perspective view of a linear motor A2 according to the second embodiment.

Next, with reference to FIGS. 10 and 11, a linear motor unit 200 according to the second embodiment will be described. FIG. 10 is a perspective view of a linear motor unit according to the second embodiment. FIG. 11 is a perspective view of a linear motor A2 according to the second embodiment. The same components as those of the first embodiment are denoted by the same references and the description thereof is omitted.

As shown in FIGS. 10 and 11, the linear motor unit 200 according to the second embodiment differs from the first embodiment in that the linear motors A2 and the linear motors B are assembled together and are rotated by separate (two) rotary motors 7.

That is, the linear motor unit 200 of the second embodiment uses the linear motor A2 instead of the linear motor A1. The armature 2 of the linear motor A2 is positioned such that the distal end of the magnetic cover 40 is disposed spaced from the shaft guide supporting section 82. Specifically, the armature 2 of the linear motor A2 is positioned such that the distal end of the magnetic cover 40 corresponds to the step 56. The ball spline bushing (shaft guide 80) of the linear motor A2 is disposed to extend from the outside (the distal end) of the shaft guide supporting section 82.

On the other side, the armature 2 of the linear motor B is positioned such that the distal end of the magnetic cover 40 is in contact with the shaft guide supporting section 82 as similar to the first embodiment. The ball spline bushing (shaft guide 80) of the linear motor B is disposed to extend from the outside (the distal end) of the shaft guide supporting section 82.

That is, when the plurality of linear motors A2 and linear motors B are alternatively arranged side by side, the shaft guide supporting sections 82 of the linear motors A2 and the shaft guide supporting sections 82 of the linear motors B are arranged in an alternative pattern. The ball spline bushings (shaft guides 80) of the linear motors A2, B are disposed on the outside of the shaft guide supporting section 82.

When the linear motors A2 having the ball spline bushings positioned outside of the shaft guide supporting sections 82 and the linear motors B having the ball spline bushings positioned outside of the shaft guide supporting sections 82 are assembled together, the separate timing belts 8 are wound around of the ball spline bushings of a group of linear motors A2 and a group of linear motors B, respectively, so that the ball spline bushings of a group of linear motors A2 and a group of linear motors B are driven by separate rotary motors 7.

The linear motor unit 200 according to the second embodiment has an essentially similar operational advantage as that of the first embodiment.

Particularly, in the linear motor unit 200 according to the second embodiment, the plurality of linear motors A2 having the ball spline bushings positioned outside of the shaft guide supporting sections 82 and the plurality of linear motors B having the ball spline bushings positioned outside of the shaft guide supporting sections 82 are alternatively arranged side by side.

Accordingly, the linear motor unit 200 according to the second embodiment has a specific effect that the ball spline bushings of a group of linear motors A2 and the ball spline bushings of a group of linear motors B can be driven by separate rotary motors 7.

Although the preferred embodiments of the present invention have been described, those are merely examples for description of the present invention and the scope of the invention is not limited thereto. The invention may be practiced in various embodiments in addition to the above embodiments without departing from the spirit of the invention.

The entire disclosure of Japanese Patent Application No. 2013-197493 filed on Sep. 24, 2013 including specification, claims, drawings and summary are incorporated herein by reference in its entirety.

What is claimed is:

1. A linear motor unit comprising:
   at least one first linear motor in which an armature is disposed spaced from a shaft guide supporting section which is provided at a distal end of a frame, and a shaft guide is disposed on a proximal side of the shaft guide supporting section; and
   at least one second linear motor in which an armature is disposed in contact with the proximal side the shaft guide supporting section which is provided at the distal end of the frame, and the shaft guide is disposed on the distal side of the shaft guide supporting section,
   wherein the first linear motors and the second linear motors are alternatively arranged in a width direction of the frame with the respective shaft guides of the linear motors aligned with each other,
   the shaft guide supporting section supports a shaft guide in a rotatable manner,
   the shaft guide supports the shaft in a reciprocatable manner, and
   the shaft guide is rotated by a rotary motor.

2. A linear motor unit according to claim 1, wherein a receiving groove is formed on an outer periphery of the shaft in an axis direction of the shaft so as to receive a ball of the shaft guide.

3. A linear motor unit according to claim 1, wherein each linear motor includes an exciter that houses a plurality of permanent magnets in the shaft, and the armature that includes a plurality of coils which surrounds the exciter and a magnetic cover which covers the coils.

4. A linear motor unit according to claim 1, wherein the frame is formed as an L-shaped frame by supporting the shaft guide supporting section.

5. A linear motor unit according to claim 1, wherein the shaft guides of the first linear motors and the second linear motors are driven by the same rotary motor.

6. A linear motor unit according to claim 1, wherein a cooling passage that allows a cooling air to pass through is formed on the frame.

7. A linear motor unit comprising:
   at least one third linear motor in which an armature is disposed spaced from a shaft guide supporting section which is provided at a distal end of a frame, and a shaft guide is disposed on a distal side of the shaft guide supporting section; and
   at least one second linear motor in which an armature is disposed in contact with the proximal side the shaft guide supporting section which is provided at the distal end of the frame, and the shaft guide is disposed on the distal side of the shaft guide supporting section,
   wherein the third linear motors and the second linear motors are alternatively arranged in a width direction of the frame with the respective shaft guides of the linear motors aligned with each other,
   the shaft guide supporting section supports shaft guide in a rotatable manner,
   the shaft guide supports the shaft in a reciprocatable manner, and
   the shaft guide is rotated by a rotary motor.

8. A linear motor unit according to claim 7, wherein a receiving groove is formed on an outer periphery of the shaft in an axis direction of the shaft so as to receive a ball of the shaft guide.

9. A linear motor unit according to claim 7, wherein each linear motor includes an exciter that houses a plurality of permanent magnets in the shaft, and the armature that includes a plurality of coils which surrounds the exciter and a magnetic cover which covers the coils.

10. A linear motor unit according to claim 7, wherein the frame is formed as an L-shaped frame by supporting the shaft guide supporting section.

11. A linear motor unit according to claim 7, wherein the shaft guides of the third linear motors and the second linear motors are driven by separate rotary motors.

12. A linear motor unit according to claim 7, wherein a cooling passage that allows a cooling air to pass through is formed on the frame.

* * * * *